United States Patent
Springfield

[15] 3,637,438
[45] Jan. 25, 1972

[54] THERMOCOUPLE GUIDE

[72] Inventor: Redwood L. Springfield, 3827 Sun Valley, Houston, Tex. 77025

[22] Filed: May 13, 1965

[21] Appl. No.: 455,402

[52] U.S. Cl. ............................................. 136/230, 136/242
[51] Int. Cl. ........................................ H01v 1/00, H01v 1/02
[58] Field of Search ............................... 136/230–235, 242, 136/201; 73/359, 341; 46/221

[56] References Cited

UNITED STATES PATENTS

| 474,547 | 5/1892 | Corscaden | 46/221 |
| 806,872 | 12/1905 | Clark | 46/221 |
| 1,124,654 | 1/1915 | Pomeroy | 46/221 |
| 1,309,240 | 7/1919 | Chappuis | 46/221 |
| 3,263,502 | 8/1966 | Springfield | 136/230 X |
| 2,835,718 | 5/1958 | Stickney et al. | 136/231 |
| 1,365,465 | 1/1921 | Des Isles | 136/232 |

*Primary Examiner*—Allen B. Curtis
*Assistant Examiner*—M. J. Andrews
*Attorney*—Robert W. B. Dickerson

[57] ABSTRACT

A flexible central support having a plurality of hollow guides spirally wrapped therearound, and individual thermocouple cables removably inserted within each guide. Spiderlike positioners are spaced along the support to extract individual guides and lead the remainder to their proper location.

10 Claims, 6 Drawing Figures

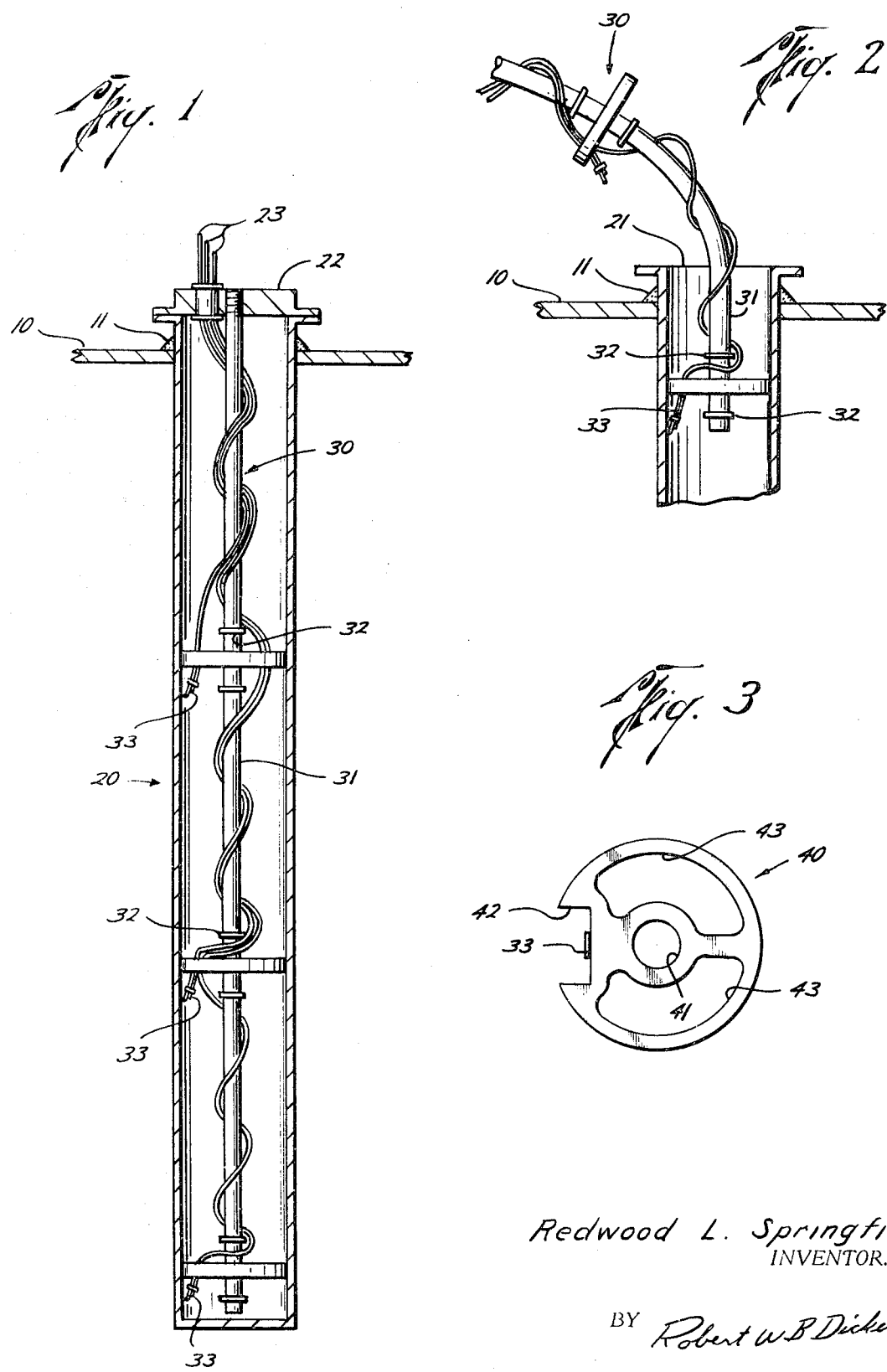

PATENTED JAN25 1972 3,637,438
SHEET 2 OF 2
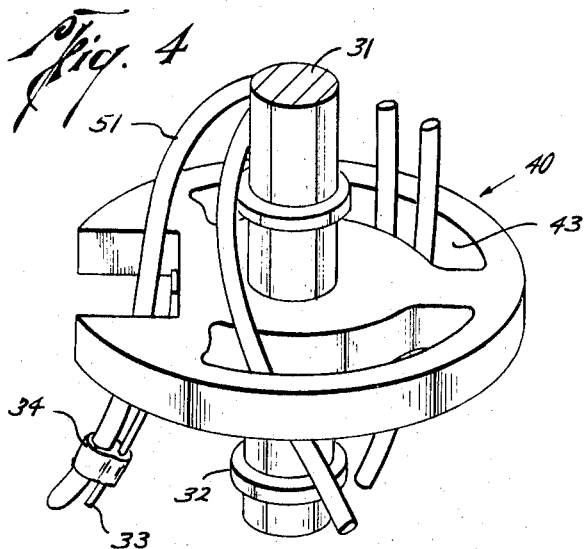
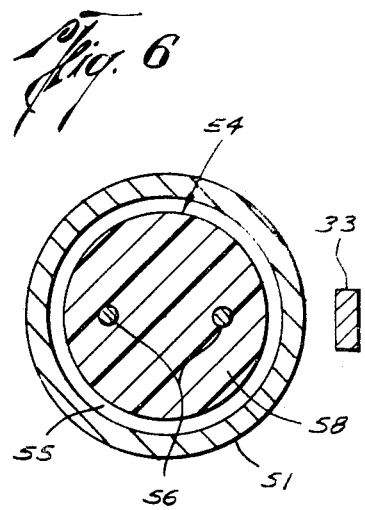
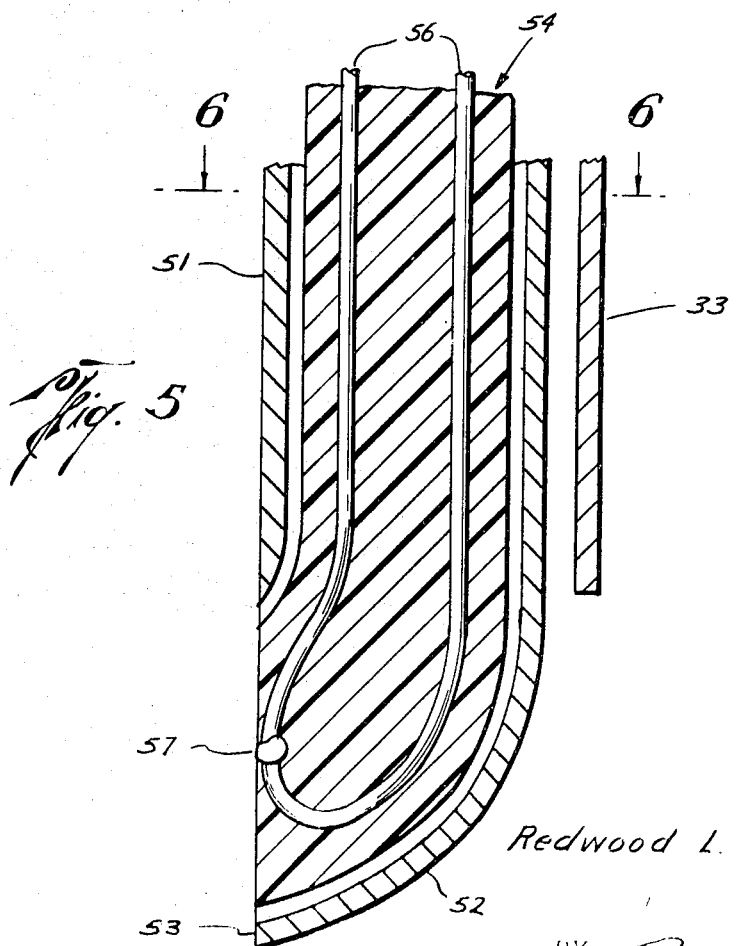
Redwood L. Springfield
INVENTOR
BY Robert W. B. Dickerson
ATTORNEY

THERMOCOUPLE GUIDE

SUMMARY OF THE INVENTION

This invention pertains to devices for measuring internal chamber temperatures, and specifically to those using a plurality of spaced thermocouples to perform such measurements.

Temperature-measuring devices utilizing thermocouples find numerous applications in modern industry, an example being refinery reactors having heights of 100 feet or more. Temperature measurements need be taken at various depths to assure occurrence of desired reactions. Since such chambers or reactors may have great height, any measuring device that is to be inserted into the reactor or chamber well, will necessarily be long, since measurements throughout the chamber are desired. In order, then, for complete measurements to be taken, the housing for such a reactor must provide a clearance above the reactor of substantially the height of the reactor, if a rigid measuring instrument is utilized.

Flexible supports, such as that described in my presently pending U.S. application Ser. No. 339,194, now U.S. Pat. No. 3,263,502, have been proposed to basically permit the insertion of flexible thermocouple supports (or flexible supports for other measuring devices). Such a flexible support may obviously be bent and therefore, much less clearance is needed between the entry portion of the vessel, usually vertically positioned, and the nearest barrier, usually a ceiling. It would be possible for flexible supports such as described herein to be inserted into a well at some point other than through the well top, as for example, upwardly inserted through an opening in the well bottom. However, it has been found that if thermocouple cables, for example, are simply wrapped around a flexible support or core and then inserted into a vessel well, the cables oftentimes possess small kinks received in shipment and tend to become bound within the well. Not only does this increase the friction between the well's inner wall and the cable, thus making penetration difficult, but also makes exact placement of the measuring junctions difficult, if not impossible.

More important, when plural measurements are necessary, involving plural measuring points and instruments, it oftentimes becomes desirable to remove one measuring instrument, perhaps a thermocouple cable, without disturbing the remainder of the instruments.

This invention is designed to improve on my earlier described patent, overcome the "kinking" tendency, permit cable to more expeditiously be wrapped around a support, to permit removal and reinsertion of single measuring instruments under operating conditions, and to accomplish still further objects that will become apparent hereinafter.

Basically, this invention provides for flexible cable guides to be wrapped around a central support. Thermocouple devices are inserted within said cable guides, the guides positioned through a plurality of washer-type devices therein or "spiders," which spiders circumscribe the central support, following which the spiders may be twisted, thereby wrapping the various guides, containing thermocouple devices therein, around the central support.

The specific means of accomplishing the various objects will become more apparent on considering the following description and drawings, in which:

FIG. 1 is a longitudinal view, partly in section, of the thermocouple support and assembly inserted within a vessel well;

FIG. 2 is a partially sectionalized longitudinal view of the thermocouple assembly partially inserted within the well;

FIG. 3 is an elevation of the spider used to position the various guides;

FIG. 4 is a perspective depicting a plurality of cable guides positioned by the spider;

FIG. 5 is a cross section of a portion of a cable guide and the thermocouple-containing cable contained therein; and FIG. 6 is a vertical section of a portion of a cable guide near one end thereof.

Considering first FIGS. 1 and 2, the upper wall 10 of a chamber or vessel is partially shown. Inserted thereinto, and perhaps affixed by welding, as at 11, is a well 20 which is closably open at its upper mouth 21. Insertable within the confines of well 20 is a measuring device or thermocouple assembly generally indicated as 30. Such a device is intended to be inserted within a reactor well and provide indications of temperature at various levels of the reactor. Of course, the well may be provided with a removable cover such as illustrated at 22 through which leads 23 may pass leading to conventional metering instruments (not shown), from which the temperature at various depths may be read.

Considering the measuring device 30 more specifically, a hollow tubular central support member 31 will be seen to form the framework for the entire device. Support member 31 is flexible, as shown in FIG. 2, so that it may be angularly inserted within well 20. Structural materials such as aluminum permit such bending. Positioned periodically along the length of central support 31 are pairs of positioning lugs 32. Intermediate opposed units of each of said pairs is a spider or positioning means 40, specifically described hereinafter. The spider is utilized to isolate a single cable guide from a plurality, and to lead the remainder toward their eventual destination. Wrapped in a spiral fashion around central support 31 are a plurality of thermocouple cable guides 51, see FIG. 4.

To this stage, with the exception of cable guides 51 which were nonexistant the structure presented herein is generally described by my earlier described copending application. The improvement in this invention includes the structure of spider or positioning device 40 and that of thermocouple-containing guides 51.

In actual transportation of a spirally wound thermocouple assembly, there has been exhibited a tendency for kinks or knots to form in the wrapped thermocouple cable. This has resulted in difficulty being encountered on insertion of the assembly into a well such as 20 in FIG. 1. Frictional binding has occurred. This may result in fraying of cables, ineffectiveness of positioning the thermocouple junction and even difficulty in removing an assembly which has become "stuck."

An additional difficulty encountered has been the extended time consumed in wrapping long support members with a large number of cables necessary when temperatures must be measured at many levels of a deep well. Conventional spiders have required substantially individual assembly and have exhibited a tendency to cock or cant when inserted within a well.

Of great importance with respect to this invention is overcoming the difficulty encountered when the necessity arises to remove a single measuring instrument from a group, such as a number of spirally wrapped thermocouple cables. The need may arise, for example, through damage to one of the plurality of measuring instruments.

The first of the above problems has been solved in the following manner, see especially FIGS. 5 and 6. In earlier applications simple thermocouple-containing cables were utilized, these being wrapped around the central support member. Here, however, hollow flexible guide members 51 are spirally wrapped around central support 31. Guides 51 are obviously of different lengths so that each guide ends adjacent the point at which the temperature is to be taken. One end of guide 51 may be slightly dished, as at 52, and open at 53. This enables cable 54, which is nonintegral with guide 51, to slidably pass through and be guided by guide 51 to the exactly desirable position. Members 54 are described as cables, but may include an outer jacket 55, diverse elements 56 forming the thermocouple, with junction as at 57, and a filler material 58 surrounding elements 56. Thus, considering only a single thermocouple, guide 51 will wind around support 31, be positioned adjacent the well wall by spider 40 (see FIG. 4), serve as a container and guide for slidably insertable and removable cable 54 and, by dished portion 52, position said cable adjacent the vessel wall. A bimetallic strip 33, such as described in U.S. Pat. No. 3,015,234, may be attached to spider 40 and to guides 51, as at 34, to cause guide 51 to press the thermocouple junction against the inner wall of the well. Materials readily fabricatable into guides such as member 51 include stainless steel, Inconel, and other materials. These can withstand temperatures up to 2,000° F. Further, they have sufficient strength and flexibility to permit operation with diameters of 3/16 inch containing a ⅛-inch thermocouple cable.

The solution to problem 2, above, is illustrated graphically in FIGS. 3 and 4. Generally circular spider 40 possesses a central aperture 41, slidably accommodated by support 31 so that the spider will be limited only by lugs 32. At the perimeter of member 40, there is a relatively rectangular cutout portion 42, forming a recess. The space defined by such portion accommodates a single thermocouple guide and places it in the desired location adjacent the vessel wall. Intermediate aperture 41 and the periphery of the spider are perforations 43. Guides 51 pass through these apertures en route to a lower area. Note that the passageways defined by these perforations are separated from the space defined by cutout 42 by solid material or webs.

The third problem is solved by the very nature of the construction. Since cable members 54 are slidably and removably insertable within hollow guides 51, when the entire thermocouple assembly is positioned as in FIG. 1, individual cables may be withdrawn and reinserted as desired, the guides 51, remaining in place. Obviously, each guide 51 may be keyed as by color, if desired, to indicate the relative depth or position of its measuring position. In operation, a plurality of guides 51 may be laid out parallel to support 31, said guides being passed through one or the other of apertures 43. There may well be a number of spiders 40 spaced along the length of support 31, with guides 51 passing therethrough. In order to accomplish the spiralling of the cables around support 31, the spiders 40 may simply be twisted or rotated relative to support 31. This rotary motion will move the various guides along with the spider, since said guides are confined within apertures 43 or cutout 42. As is obvious, at each spider location a single guide 51, and the thermocouple cable contained therein, departs from the spiralled mass wrapped around support 31 and passes through cutout 42 thereunder to rest in its temperature-measuring position (see FIGS. 1, 2 and 4). Also, it should be made clear that in order to achieve the continuous spiral effect along the length of support 31, each successively lower spider would be rotated an additional increment. For example, the initial spider might be rotated one half turn, the next one a full turn, the next by one and one half turns, etc. This manner of spiralling the cables greatly expedites the procedure and accurately positions the individual thermocouple junctions.

Although a single embodiment of this invention has been depicted, it is not intended to limit the scope of this invention thereby, but only by the following claims in which

I claim:

1. A thermocouple assembly including:
a flexible central support member;
a plurality of guide positioning members spacedly positioned along said central support member;
a plurality of hollow thermocouple-cable guides spirally wound around said central support member, each guide being adapted to have a thermocouple cable freely and slidably insertable therein and removable therefrom.

2. A temperature measuring assembly including:
a central support member;
a plurality of guide positioning members spaced along the length of said central support member;
a plurality of hollow guides each adapted to freely and slidably receive therein and have removed therefrom individual temperature measuring elements, said guides being spirally wound around said central support member, each guide having one end positioned relative to said central support by at least one of said guide positioning members, and said guide end being internally dished to outwardly bias said temperature-measuring elements.

3. In a device for taking measurements at a plurality of locations, the combination of:
a flexible central support member;
a plurality of flexible hollow cable guides, open at at least one end, spirally wound around said central support, said guides each being adapted to freely and slidably receive therein and have removed therefrom thermocouple cables;
a plurality of positioning members rotatably and slidably engageable with said central support, said positioning members having means thereon for positioning said guides outwardly from said central support.

4. The device of claim 3 wherein each of said positioning members have their motion along the axis of said central support limited by a pair of lugs affixed to said central support, and said positioning members have guide encompassing portions permitting said guides to be positioned relative to said central support.

5. A device for positioning a plurality of cables relative to a vessel wall, including:
a disc, said disc having a centrally apertured portion to accommodate a central support;
cable passageway means radially exterior of said centrally apertured portion and interior of the perimeter of said disc; and
individual-cable positioning means at the periphery of said disc, said positioning means including (1) a recessed portion of said disc periphery of sufficient depth to permit a cable to pass therethrough, and (2) one wall of said recessed portion having means provided thereon for biasing a cable toward said vessel wall.

6. The device of claim 5 wherein the cable passage means includes a plurality of perforated portions in said disc, each of said perforated portions being separated from the other perforated portions by solid material in said disc, and said recessed portion is separated from said perforated portions and from said centrally apertured portion by solid material in said disc.

7. A thermocouple assembly including:
a central support member;
a plurality of guide positioning members slidably encompassing said central support, said guide positioning members having their movement limited by lugs, which lugs are affixed to said central support; and
a plurality of hollow guides wrapped around said central support, each of said guides having a freely and slidably insertable and removable thermocouple cable passing therethrough.

8. A thermocouple assembly including:
a flexible central support member;
a plurality of spiders slidably affixed to said central support;
a plurality of hollow flexible guides wound around said central support, each of said guides passing through an opening in at least one of said spiders; and
a freely and slidably insertable and removable thermocouple cable inserted within each of said guides.

9. The assembly of claim 8 wherein each of said spiders includes means thereon for yieldably forcing said guides away from said central support.

10. A thermocouple assembly including:
a flexible central support member;
a plurality of guide positioning members slidably engaged with said central support;
a plurality of hollow guides adjacent said central support, each guide being adapted to freely and slidably receive therein and permit removal therefrom a thermocouple cable, and each guide being positioned by at least one of said guide positioning members; and
a thermocouple cable, including a thermocouple junction at one end thereof, slidably inserted within each of said guides, said junction being directed outwardly from said central support by a dished portion of said guide at one end of each of said guides.

* * * * *